(12) United States Patent  (10) Patent No.: US 8,566,891 B2
McKelvey et al.  (45) Date of Patent: Oct. 22, 2013

(54) SYSTEMS AND METHODS FOR MONITORING, TROUBLESHOOTING AND/OR CONTROLLING A DIGITAL TELEVISION

(75) Inventors: Henry A. McKelvey, Capitol Heights, MD (US); Rosa M. Underwood, Washington, DC (US); Umang A. Patel, Bellerose, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1076 days.

(21) Appl. No.: 12/058,918

(22) Filed: Mar. 31, 2008

(65) Prior Publication Data

US 2009/0244290 A1  Oct. 1, 2009

(51) Int. Cl.
*H04N 7/173* (2011.01)

(52) U.S. Cl.
USPC .............................. 725/107; 725/132; 348/180

(58) Field of Classification Search
USPC .................. 348/177, 180, 181; 725/106–125, 725/131–134, 139–142, 151–153
See application file for complete search history.

(56) References Cited

U.S. PATENT DOCUMENTS

| | | | | |
|---|---|---|---|---|
| 5,359,265 A * | 10/1994 | Kii et al. | ........................ | 315/367 |
| 6,487,723 B1 * | 11/2002 | MacInnis | ...................... | 725/132 |
| 6,498,536 B1 * | 12/2002 | Mori | ................................ | 331/11 |
| 6,718,374 B1 * | 4/2004 | Del Sordo et al. | ............ | 709/220 |
| 7,893,941 B2 * | 2/2011 | Day et al. | ...................... | 345/520 |
| 2007/0098355 A1 * | 5/2007 | Kim | ................................ | 386/46 |

* cited by examiner

*Primary Examiner* — Annan Shang

(57) ABSTRACT

A system for monitoring, troubleshooting, controlling, calibrating and/or configuring a digital television is provided. The system includes a functionality module configured to perform one or more functions of a digital television. The system includes a testing module associated with the digital television, communicatively coupled to the functionality module and being configured to receive from the functionality module, data indicative of the one or more functions of the digital television. The testing module is configured to perform processing using the received data to determine whether to alter one or more parameters associated with the one or more functions of the digital television.

19 Claims, 4 Drawing Sheets

SYSTEMS AND METHODS FOR MONITORING, TROUBLESHOOTING AND/OR CONTROLLING A DIGITAL TELEVISION

BACKGROUND INFORMATION

The convergence of advancements in television and digital technology has resulted in an increase in the popularity and functionality of digital television ("DTVs"). Increased functionality has provided for audio and video presentation that may be superior to that for analog television as well as increased support services such as picture in picture, voice over internet protocol ("VoIP"), speaker phone, caller identification, video phone applications and the like. However, such increases in functionality have resulted in an increase in complexity that may exacerbate monitoring, troubleshooting and/or controlling the DTV with ease.

Further, in conventional DTV systems and methods of operating DTV systems, troubleshooting is typically performed only after a deviation and corresponding failure event have occurred. However, after such occurrences, consumers may be saddled with significant repair and/or replacement costs. Conventional DTV systems and methods disadvantageously fail to provide preventative maintenance to reduce the likelihood of deviations and failure events.

Further, conventional DTV systems and methods typically provide only information about the general area in which a DTV may need troubleshooting, calibration and/or configuration. However, due to the complexity of the DTV, providing information about only a general area in which the DTV may need service may be inadequate and may lead to unnecessarily high troubleshooting costs. Finally, conventional systems and methods provide no mechanisms for automated, internal monitoring, troubleshooting and/or controlling the DTV.

BRIEF DESCRIPTION OF THE DRAWINGS

The purposes and the scope of exemplary embodiments described below will be apparent from the following detailed description in conjunction with the appended drawings in which like reference characters are used to indicate like elements, and in which.

DETAILED DESCRIPTION OF EXEMPLARY EMBODIMENTS

Figure 1:
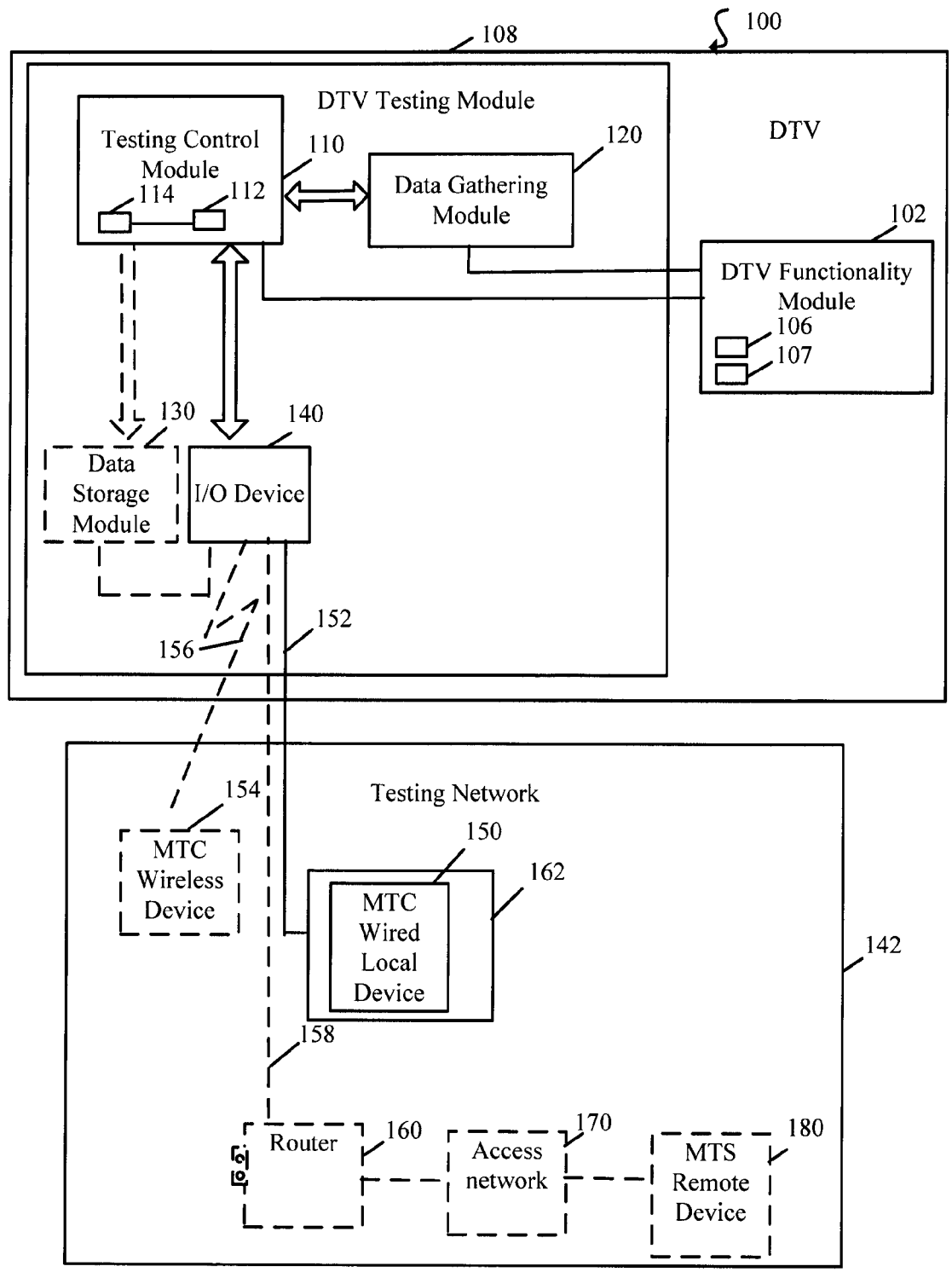
FIG. 1 is a schematic diagram of a DTV monitoring, troubleshooting and/or controlling system in accordance with exemplary embodiments.

Exemplary embodiments, systems, methods, modules and computer-readable mediums for monitoring, troubleshooting, controlling, calibrating and/or configuring DTVs are provided. In exemplary embodiments, a system for monitoring, troubleshooting, controlling, calibrating and/or configuring of a digital television is provided. A system for monitoring, troubleshooting, controlling, calibrating and/or configuring a digital television is provided. The system may include a functionality module configured to perform one or more functions of a digital television. The system may include a testing module associated with the digital television, communicatively coupled to the functionality module and being configured to: receive from the functionality module, data indicative of the one or more functions of the digital television. The testing module may be configured to perform processing using the received data to determine whether to alter one or more parameters associated with the one or more functions of the digital television.

In other exemplary embodiments, a module for monitoring, troubleshooting, controlling, calibrating and/or configuring of a DTV may be provided. The module may include a testing control mechanism associated with a digital television. The testing control module may be configured to receive from a functionality module configured to control one or more functions of the digital television, data indicative of the one or more functions of the digital television. The testing control module may also be configured to perform processing using the received data to determine whether to alter one or more parameters associated with the one or more functions of the digital television.

In other exemplary embodiments, a method of operating a testing control module of a digital television is provided. The method may include receiving data indicative of functionality of a digital television, and, in response to receiving the data indicative of functionality, comparing the received data with a range of previously-stored data. The method may also include in response to comparing the received data with the range of the previously-stored data, determining whether the received data is outside of a range of acceptable similarity to the range of the previously-stored data. The method may also include in response to determining that the received data is outside of the range of acceptable similarity to the range of the previously-stored data, altering one or more parameters of the digital television.

In another embodiment, a computer-readable medium having an executable computer program including instructions to perform steps of the above-mentioned method may be provided.

The description below describes systems, methods, computer-readable mediums and modules for monitoring, troubleshooting, controlling, calibrating and/or configuring of DTVs. Each of the modules may include one or more additional modules, some of which are explicitly shown in the figures and others that are not. As used herein, the term "module" means computing software, firmware, hardware, circuitry and/or various combinations thereof. It is noted that the modules are merely exemplary. The modules may be combined, integrated, separated, and/or duplicated to support various functions and/or applications. Also, a function described herein as being performed at a particular module may be performed at one or more other modules instead of or in addition to the function performed at the particular module described. Further, the modules may be implemented across multiple devices, software and/or other components local or remote to one another. Additionally, the modules may be moved from one device and added to another device, and/or may be included in both devices.

As used herein, the term "digital television" ("DTV") means television units, or their corresponding services, that provide audio and/or video presentation in response to digital information transmitted to and from a digital tuner communicatively coupled to the television unit or that provide audio and/or video presentation in response to digital information that is converted into analog information inside of the television unit. In exemplary embodiments, DTV may include, but is not limited to, the well-known standard definition television ("SDTV"), high definition television ("HDTV") or super high definition television ("SHDTV"). In exemplary embodiments, SDTV may have the respective vertical resolutions and aspect ratios of: 480 and 4:3 (or 16:9). The SDTV frame rates may be progressive or interlaced. Progressive frame rates at which SDTV may be displayed may include 24p, 30p or 60p. The interlaced frame rate at which SDTV may be displayed may include 60i. In exemplary embodiments, HDTV may have the respective vertical resolutions and aspect ratios of be: 720 or 1080 and 16:9. The HDTV frame rates may be progressive or interlaced. Progressive frame rates at which HDTV may be displayed may include 24p, 30p or 60p for a vertical resolution of 720 lines and 24p or 30p for a vertical resolution of 1080. The interlaced frame rate at which HDTV may be displayed may include 60i for a vertical resolution of 1080. In exemplary embodiments, SHDTV may be any type of digital television having a greater vertical resolution than that of SDTV and/or HDTV. For example, in exemplary embodiments, SHDTV may have a vertical resolution that is at least four times the vertical resolution of HDTV. In other exemplary embodiments, SHDTV may have a vertical resolution that is at least 24 times the vertical resolution of SDTV.

In exemplary embodiments, DTV may include, but is not limited to, television defined by Advanced Television Standards Committee ("ATSC") standard: "A/53: ATSC DTV Standard, Parts 1-6, 2007" or by ETSI EN 302 307 V11.2 (2006-06): "Digital Video Broadcasting (DVB); Second generation framing structure, channel coding and modulation systems for Broadcasting, Interactive Services, News Gathering and other broadband satellite applications," the content of each of which are incorporated herein by reference in their entirety. Exemplary embodiments of types of DTVs may include, but are not limited to, plasma, liquid crystal display ("LCD") and digital light processing ("DLP") televisions, jumbotrons and any televisions or corresponding services that provide audio and video presentation in response to digital information transmitted to and from the television.

FIG. 1 is a schematic diagram of a DTV monitoring, troubleshooting and/or controlling system ("DTV-MTCS") in accordance with exemplary embodiments. The embodiment of the DTV-MTCS shown may include a DTV 108 having a DTV functionality module 102 and a DTV testing module 104. The DTV functionality module 102 may be communicatively coupled to the DTV testing module 104. As shown, the DTV-MTCS may include a testing network 142 communicatively coupled to the DTV testing module 104.

In the embodiment shown, the DTV testing module 104 is located inside of the DTV 108. However, the DTV testing module 104 may be located at any location in association with the DTV 108 and may be located inside or outside of the DTV 108. For example, the DTV testing module 104 may be located in a processor inside of the DTV 108. As another example, the DTV testing module 104 may be located inside of or in association with a set top box outside of the DTV 108.

The DTV functionality module 102 may include one or more system sections (not shown) communicatively coupled to one another and/or configured to provide functionality related to audio and/or video presentation to a viewer of the DTV 108. In exemplary embodiments, the system sections are configured to provide functionality including, but not limited to, video, chroma, horizontal and vertical deflection, RF input, audio, power supply and/or display functionality.

The DTV functionality module 102 may include one or more test points 106, 107 at the input and/or output of one or more of the system sections or at intermediate points within the system sections. The DTV functionality module 102 transmits to the DTV testing module 104 data located at the one or more test points 106, 107.

The data may be indicative of one or more of any functionality of the DTV including, but not limited to, input signal, video, audio, synchronization and deflection, power supply, speaker and output functionality. In various embodiments, the data may be indicative of a number of phenomena related to the aforementioned functions, including, but not limited to, voltage levels; current levels; horizontal and vertical oscillator frequencies; a level of a radio frequency ("RF") tuner; the input/output ("I/O") for each of the interfaces of the DTV, audio and video synchronization, color intensity and/or sharpness. In some embodiments, the data may be a function of the type of the DTV. For example, for plasma or LCD DTVs, data may be indicative of the screen intensity, type or life span. With an LCD DTV, data may be indicative of the voltage levels on the inverter of the backlight circuit, which controls screen intensity. With a projection DTV, data may be indicative of the panel voltages on each of the cathode ray tube ("CRT") elements or at the anode of the CRT.

Accordingly, in some cases, the data may be used to monitor and/or troubleshoot deviations and failure events. As used herein, the term "deviation" means a change in a measurable quantity associated with the DTV 108 relative to a factory recommended value or range of values for the measurable quantity that is significant enough to cause and/or lead to a failure event. In one or more embodiments, deviations may be caused by any number of factors, including, but not limited to, changes in hardware, software and/or firmware, and/or configurations thereof, associated with the DTV 108. Changes in hardware, software and/or firmware, and/or configurations thereof, may be caused by any number of factors, including, but not limited to, updates from the manufacturer or other third-parties, such as a service technician, user tampering or otherwise. As used herein, the term "failure event" means an error in the functionality of the DTV 108 that is perceptible to the human eye. In various embodiments, the measurable quantity may be a voltage or a current inside of the DTV 108. For example, if there is drift of the high voltage at the anode of a CRT that is significant enough to be a deviation, the failure events of picture blooming or shrinking may occur.

In some embodiments, whether a change in a measurable measurable is significant enough to cause a failure event may depend on the functionality being represented by the measurable quantity. For example, a change in the measurable quantity representative of horizontal frequency in the DTV 108 may change in the amount of 2-5% relative to the factory recommended value and may be a deviation. In this embodiment, the deviation may cause the failure event of tearing in the picture. Further, if the horizontal frequency drifts 50 kHz relative to the factory recommended value, this change is a deviation that results in tearing in the picture of the DTV 108.

In another example, a change in the measurable quantity representative of convergence in the DTV 108 may change in the amount of 10% relative to a factory recommended value before any deviation and corresponding failure event occurs. In another example, a change in the measurable quantity representative of convergence in the DTV 108 may be a deviation and therefore lead to a failure event if the adjustment of the convergence is or changes to one sixteenth of an inch ("1/16"") more or less than the factory recommended value.

In some embodiments, the data may be used to generate electronic and/or paper reports indicative of the functionality of the system sections, troubleshoot a failure event, calibrate and/or configure parameters of a DTV. In one example, the embodiments herein may be used to monitor, troubleshoot, control, calibrate and/or configure DTVs, jumbotrons or the like. For example, monitoring, troubleshooting, controlling, calibrating and/or configuring of DTVs may be performed from locations that are local to or remote from the DTV and/or may be performed while a consumer views the DTV presentation. As another example, monitoring, troubleshooting, controlling, calibrating and/or configuring for jumbotrons may be performed from locations that are local to or remote from the jumbotron and may be performed while a consumer views the jumbotron presentation such as while a consumer views a jumbotron screen during a concert.

Referring back to FIG. 1, the DTV testing module 104 may include a testing control module 110 communicatively coupled to a data gathering module 120. The DTV testing module 104 may include an I/O device 140 communicatively coupled to the testing control module 110. In other exemplary embodiments, the DTV testing module 104 may include a storage module 130 communicatively coupled to the testing control module 110 and/or the I/O device 140. Each of the components of the DTV testing module 104 may be implemented as hardware, software or a combination of hardware and software.

The testing control module 110 may be any module configured to provide monitoring, troubleshooting, controlling, calibrating and/or configuring the DTV 108, data logging, electronic and/or paper report generation and/or communication with devices external to the DTV testing module 104 and/or with a user. For example, a testing control module 110 may be a processor, microprocessor, computer, ASIC and/or software or the like configured to provide monitoring, troubleshooting, controlling, calibrating and/or configuring the DTV 108, data logging, electronic and/or paper report generation and/or communication with devices external to the DTV testing module 104 and/or with a user.

In one embodiment, the testing control module 110 may include a data logging module 112 coupled to a processor 114. The data logging module 112 may be configured to store selected data received from the DTV functionality module 102 or generated by the testing control module 110. The data logging module 112 may be configured to permanently store the received or generated data. The data logging module 112 may be a hard drive of the testing control module 110, for example. The processor 114 may be any module configured to process data in digital form and may, for example, be an ASIC designed to perform monitoring, troubleshooting, controlling, calibrating and/or configuring of the DTV 108, report generation, trending and other functions for the DTV 108. The testing control module 110 may be any number of different types of hardware and/or software modules providing storage and/or processing functionality. In various embodiments, the processing may be performed by any number of different types of operating systems, including, but not limited to, Unix-based operating systems such as the Linux operating system.

The data gathering module 120 may be configured to receive streaming data from the DTV functionality module 102, temporarily store the data received from the DTV functionality module 102, convert data in analog format to data in digital format, and/or output received data to the testing control module 110. The data may be temporarily stored while the DTV testing module 104 is in any operational state and/or while data may be streaming through the data gathering module 120. In some embodiments, the data gathering module 120 may be configured to transmit information, such as control (e.g., calibration and/or configuration) instructions, in data that is in analog format to the DTV functionality module 102. The data gathering module 120 may include an analog-to-digital converter, a digital-to-analog converter and/or a module configured to manage and/or process streaming data.

The data gathering module 120 may be configured to receive data indicative of alternative current ("AC") input voltage, scan rectified derived direct current ("DC") voltages (regulated and unregulated), deflection (horizontal and vertical), high voltage systems for display, including, but not limited to, CRT, LCD thin film transistor ("TFT") and plasma displays, and/or various video and audio data within the DTV.

The storage module 130 may be coupled to the testing control module 110. In some embodiments, the storage module 130 may be removably coupled to the testing control module 110. The storage module 130 may be configured to store information received and/or generated by the testing control module 110. Stored information may include, but is not limited to, textual, graphical or audio information in HTML, XML or any other suitable format. In exemplary embodiments, the storage module 130 may provide a storage location for one or more electronic files including information indicative of factory recommended parameter values for the DTV 108 and/or one or more electronic files including data indicative of normal functionality of the DTV 108. As used herein, the term "normal functionality" means the functionality of the DTV 108 when the DTV 108 is not experiencing a deviation. In some embodiments, the functionality of the DTV 108 when the DTV 108 is not experiencing a deviation is the functionality when the DTV 108 is adhering to original manufacturer configurations and/or thresholds.

In some embodiments, the storage module 130 provides a storage location for files generated during current and/or past troubleshooting sequences of the DTV, trending and/or historical information indicative of the current and/or past functionality of the DTV, diagnostic notes and/or schematic diagrams for the DTV. Such information may be accessed by the testing control module 110 during internal automated monitoring, troubleshooting, controlling, calibrating and/or configuring the DTV or by a third-party DTV repair vendor service technician during external monitoring, troubleshooting, controlling, calibrating and/or configuring of the DTV.

The storage module 130 may be any type of a number of storage mediums that may store information and be removable from the testing control module 110 and/or the I/O device, including, but not limited to, CDs, DVDs, floppy disks, memory sticks or the like.

In various embodiments, the functionality of the DTV 108 may be as follows. One or more of the system sections of the DTV functionality module 102 may transmit and/or receive information directly to and from the DTV testing control module 110 and/or the data gathering module 120. Accordingly, in some such embodiments, data may be received directly at the data gathering module 120 from the DTV functionality module 102 and transmitted from the data gathering module 120 to the testing control module. Further, in other such embodiments, data may be received directly at the testing control module 110 from the DTV functionality module 102.

In some embodiments, the transmission and receipt of information between one or more system sections of the DTV 108, the testing control module 110 and/or the gathering module, 102 may be indirect. For example, one or more of the system sections of the DTV functionality module 102 may transmit information that is then transmitted through one or more other components (not shown) of the DTV 108 before being received by the testing control module 110 and/or the data gathering module 120. As another example, the testing control module 110 and/or the data gathering module 120 may transmit information that is then transmitted through one or more other components (not shown) of the DTV 108 before being received by one or more system sections of the DTV 108.

In various embodiments, each system section may have input, intermediate and/or output data that may be transmitted along a bus (not shown) coupled to the system section and having at least two I/O points. The first I/O access point of the bus may transmit and receive data that is in analog format to and from the data gathering module 120 and the second I/O access point of the bus may transmit and receive data in digital form to and from the testing control module 110. Accordingly, in such embodiments, data may be received directly from the DTV functionality module 102 by the testing control module 110 and the data gathering module 120.

In embodiments of DLP DTVs, the DTV functionality module 102 may include a DLP processor (not shown) having an array of mirrors each controlled by a transistor switch. In this embodiment, each of the transistors may have an input and/or an output communicatively coupled to a bus. Accordingly, an entire bus may be monitored at one time. In this embodiment, the entire control stream to and from each of the transistors may be monitored.

Referring to the data gathering module 120, in one exemplary embodiment, data received from the DTV functionality module 102 may be received by the data gathering module 120 and output from the functionality module 120 to the testing control module 110. The data gathering module 120 may receive the data in analog or digital format. The module 120 may receive data that may be currently streaming from the DTV functionality module and thereby only temporarily processes and stores the streaming data. Accordingly, the data received by the data gathering module 120 from the DTV functionality module 102 may be evaluated to determine the real-time or near real-time functionality of the DTV 108. In some embodiments, the data gathering module 120 may be configured to delay or store the streaming data to allow monitoring and use of the streaming data for applications that do not require real-time and/or near real-time streaming data.

Processor 114 of the testing control module 110 may be configured to analyze data received from the functionality module 102, generate reports based on the data received from the functionality module 102 and/or generate trending information for forensic study based on data received from the functionality module 102. The data may be selected for storage in the data logging module 112 based on characteristics of the data identified by the processor 114.

In various exemplary embodiments, the testing control module 110 receives the data and may control actions of one or more of the system sections of the DTV functionality module 102 and/or the functions of the testing control module 110 as well as the data gathering module 120, the I/O device 140 and/or the storage module 130.

The testing control module 110 may be configured to monitor the data for information indicative of the signal levels and logic levels of one or more of the sections of the DTV functionality module 102 and compare these levels to stored data (or a range of data) indicative of normal functionality of the DTV 108. After comparing the data and detecting a deviation, the data logging module 112 may determine a course of action in response to input from the consumer of the DTV.

The testing control module 110 may log the information regarding the detected deviation, the corresponding failure event and/or actual or possible repair actions as a record for future use. The data may be logged for future report generation, trending of data or forensic studies to determine and/or analyze the past functionality of the DTV 108 in the event of a future failure event. In this regard, for forensic studies, the testing control module may provide a snapshot of the previous behavior of the DTV 108, which may have led to a failure event. Trending information may be particularly useful for troubleshooting, calibration and/or control after DTV 108 component changes and to configure the parameters at the factory settings. Trending may be useful during difficult troubleshooting to determine how the DTV 108 was functioning prior to the deviation, monitoring the DTV 108 through the time leading to the deviation and analyzing what may be occurring in the DTV 108 after the deviation.

In some embodiments, the consumer will be prompted to provide information indicative of the consumer's chosen course of action in response to a screen display of the DTV 108 indicating that a deviation may have been detected and repair by an authorized third-party DTV repair vendor or by the consumer requested. In some embodiments, the testing control module 110 may cause the display of or send to a consumer of the DTV 108 or a third-party vendor information indicative of the received or generated data by other communication forms. The information may be sent, for example, via electronic mail, electronic fax, broadcast signal or any other suitable forms for communicating information from the testing control module 110 to a third-party.

In response to the consumer entering information indicative of authorization for the DTV 108 to send to an approved vendor a notice of the detection of the deviation, the notice and/or information allowing the third-party DTV remote access to the DTV 108 may be transmitted to the third-party DTV repair vendor. The notice and/or information sent to the third-party DTV vendor may be in the form of electronic mail containing HTML or XML diagnostic files. In some embodiments, electronic mail containing HTML or XML diagnostic files will be sent to one or more predefined electronic mail addresses or fax telephone numbers in order to expedite possible repairs, calibration and/or configuration of the DTV parameters.

In some embodiments, the testing control module may initiate a self-correction process wherein it performs one or more of monitoring, troubleshooting, controlling, calibrating and/or configuring functions upon receiving the data or upon generating its own data such as upon generating a report. The self-correction process may be dictated by one or more computer readable instructions stored in the testing control module 110 that may be executed by the processor 114 to perform the self-correction process based on the received and/or generated data. In this regard, the DTV 108 may identify and correct deviations through an automated, internal process.

Any number of parameter of the DTV 108 may be calibrated or configured including, but not limited to, those related to convergence, focus picture intensity, picture brightness, static adjustment, the geometry of the actual picture, horizontal and vertical linearity, horizontal and vertical highs, picture blooming and/or any other parameters related to the functionality of the DTV 108.

Accordingly, in some embodiments, the DTV-MTCS may provide preventative calibration, configuration, notice and/or troubleshooting of a deviation before a failure event occurs thereby reducing the likelihood of serious damage to the DTV 108, improving the maintenance of the DTV 108, and/or its corresponding life span.

The data received or generated by the testing control module 110 may be stored in the storage module 130. Accordingly, the data indicative of the functionality of the DTV 1-9 may be monitored and evaluated at a location local to or remote from the DTV 108. For example, in some embodiments, the data may be taken to a third-party vendor location and compared to data (or a range of data) indicative of normal functionality of the DTV 108 that may be stored at a database at the third-party location.

The data received or generated by the testing control module 110 may be transmitted to the I/O device 140, which may transmit the information to a location external to the DTV testing module 104. Accordingly, in some embodiments, the data may be transmitted to a monitoring, troubleshooting, controlling, calibrating and/or configuring device located at a location local or remote to the DTV 108. For example, a third-party television repair vendor service technician may visit the premise of a consumer at which the DTV 108 may be located and access the data received or generated by the testing control module 110 through a monitoring, troubleshooting, controlling, calibrating and/or configuring device ("MTC device") 150, 154, 180 that the technician couples to the I/O device 140 in order to monitor the current real-time, near real-time or the past functionality of the DTV 108 to perform local troubleshooting, controlling, calibrating and/or configuring of the DTV 108. As another example, the technician may perform the troubleshooting, controlling, calibrating and/or configuring of the DTV 108 through an MTC device 150, 154, 180 that the technician couples to a network coupled to the I/O device 140 in order to monitor the current real-time, near real-time or the past functionality of the DTV 108.

The testing network 142 may include one or more networks and/or one or more MTC devices 150, 154, 180 communicatively coupled to one another or to one or more of the networks. By way of example, but not limitation, the testing network 142, or any network communicatively coupled to the testing network 142, may include a wired local area network ("LAN") or a wireless local area network ("WLAN") that operates to communicate information between the MTC device 150, 154, 180 and/or the DTV testing module 104. For example, the testing network 142 may be the internet and an MTC device 150, 154, 180 may communicate with the DTV testing module 104 (or the DTV testing module 104 may communicate with the MTC device 150, 154, 180) over the internet. For example, in one embodiment, a web interface may be provided on the MTC device for accessing the DTV testing module 104. Communication may be performed according to any number of communication protocols, including, but not limited to, Gbit/s Ethernet or 10 Gbit/s Ethernet as defined by the Institute of Electrical and Electronics Engineers ("IEEE") 802.3-2005 or IEEE 802.3ae standards, respectively, the contents of each of which are incorporated herein by reference in their entirety.

The MTC device 150, 154, 180 may be configured with functionality to be able to interpret data received from the DTV 108 based on the internal design of the MTC device 150, 154, 180. The internal design may be such that the MTC device 150, 154, 180 may be able to receive and/or process the data output from the DTV 108 based on the brand or type of the DTV 108. Configurations of such MTC devices 150, 154, 180 and protocols for such interpretation are well-known.

The MTC device 150, 154, 180 may be any device configured to communicate with the DTV testing module 104 at a geographical location proximate to or remote from the DTV testing module 104 to perform monitoring, troubleshooting, controlling, calibrating and/or configuring of the DTV 108. For example, the MTC device 150, 154, 180 may be, or may be configured to provide functionality of, an oscilloscope, a circuit analyzer, a data analyzer and/or a vector analyzer. In some embodiments, a digital oscilloscope may be used to store and compare data (or a range of data) to perform troubleshooting. In one embodiment, the MTC device 150, 154, 180 may be, or may be configured to provide functionality of, a VA62A signal generator, which may be used to create and measure a test signal transmitted to the DTV 108 for troubleshooting. The signal generator may be used to troubleshoot the system section of the DTV functionality module 102 that provides video functionality.

In other exemplary embodiments, the MTC device 150, 154, 180 may be used to monitor a digital tuner of the DTV functionality module 102 to determine whether proper functionality may be occurring. For example, the digital tuner may be monitored to determine whether there are proper signal levels and/or to calibrate or configure the tuner in the event that proper signal levels are not being provided. In other embodiments, the integrated circuits within the DTV 108 may be monitored. In other embodiments, the input and/or output interface of each component inside of a DTV 108 may be monitored. In various embodiments, the information monitored, diagnosed, calibrated or configured may depend on the type of the DTV 108. For example, for a plasma DTV 108, information indicative of the screen intensity and/or type of screen may be monitored, diagnosed, calibrated or configured. With an LCD DTV 108, the voltage levels on the inverter of the backlight, the functionality of the console, the data frequencies indicative of whether the LCD DTV 108 may be operating within specification, or horizontal and/or vertical synchronization may be monitored, diagnosed, calibrated or configured. With a projection DTV 108, the panel voltages on each of the cathode ray tube elements and/or the output of the reflection circuitry may be monitored, diagnosed, calibrated or configured.

In one exemplary embodiment, the MTC device 150, 154, 180 may be any device configured to receive information that may be used for human or automated diagnosis and/or control of television functions. In some exemplary embodiments, the information received may be indicative of a voltage level, a voltage increase or decrease relative to a voltage level. Accordingly, the information could be indicative of a comparison between a first voltage level and a second voltage level (or a range of voltage levels) where the second voltage level (or range of voltage levels) may be a voltage level that may be stored in any storage module, including, but not limited, a database or memory.

In other exemplary embodiments, the information may be indicative of the functionality of one or more aspects of the current or previous functionality of the DTV functionality module 102. The information may be indicative of one or more data currently or previously received from the DTV functionality module 102 by the testing control module 110 and/or monitored by the testing control module 110. The information may be indicative of data logged at the testing control module 110. The information may be indicative of trending or forensic information based on data currently or previously received at the testing control module 110.

In some embodiments, the MTC device 150, 154, 180 may be configured to control the DTV 108 by accessing information from the DTV 108, calibrating the DTV 108 and/or configuring one or more parameters of the DTV 108. For example, if the MTC device 150, 154, 180 receives information indicative of a consumer allowing access to, requesting service for or sending information regarding the functionality of the DTV 108 owned by the consumer, the MTC device 150, 154, 180 may be configured to be able to access the testing control module 110 of the DTV testing module 104 to monitor, troubleshoot, calibrate and/or configure the DTV 108 in response to the information received. The MTC device 150, 154, 180 may receive the information upon the MTC device 150, 154, 180 actively initiating a request for access to the DTV testing module 104 or upon being passively coupled to the DTV testing module 104 either locally at the site of the DTV 108 or remotely over the testing network 142.

In exemplary embodiments wherein the MTC device 150, 154, 180 may be configured to calibrate the DTV 108, the device 150, 154, 180 may determine information indicative of a pattern regarding the functionality of the DTV 108 and/or calibrate the pattern such that the functionality of the DTV 108 provides acceptable functionality. For example, the MTC device 150, 154, 180 may be configured to monitor the screen of the DTV 108 by accessing information in the testing control module 110 retrieved from a test point 106 in the DTV functionality module 102 that controls, either wholly or partly, the screen display of the DTV 108. The MTC device 150, 154, 180 may send control information to the testing control module 110 allowing the component associated with the system section for the test point 106 to be controlled by the device 150, 154, 180. In some exemplary embodiments, the device 150, 154, 180 may transmit to the testing control module 110 control information responsive to which the testing control module 110 transmits to the system section associated with the test point calibration or configuration information for respectively calibrating or configuring the system section such that the screen display may be improved.

Because the MTC device 150, 154, 180 may be software or hardware, and may be located remotely or locally from the DTV 108, numerous embodiments of the testing network 142 are possible, as shown in FIG. 1. In one exemplary embodiment, an interface port (not shown) of the MTC device 150, 154, 180 may be coupled to the interface port (not shown) of the DTV testing module 104.

In one embodiment, the MTC device 150 may be implemented as software configured to perform monitoring, troubleshooting, controlling, calibrating and/or configuring functions and that may be stored on any number of processing devices 162 having a processor (not shown) configured to implement instructions associated with the software. The instructions associated with the software may be executed by the processing device 162 to enable MTC device 150 to perform monitoring, troubleshooting, controlling, calibrating and/or configuring of the DTV 108. In various embodiments, the processing device 162 may be a personal computer ("PC"), a laptop or the like.

The processing device 162 may be coupled to the DTV testing module 104 via network 152 to transmit and/or receive information to and/or from the testing control module 110 in accordance with instructions generated by the software of the MTC device 150. In one exemplary embodiment, network 152 may be coupled to a Universal Serial Bus ("USB") interface port (not shown) of the DTV testing module 104. The USB interface port may be optoisolated from the processing device to provide protection from galvanic disturbances that may result from stray AC voltage on the metallic connections of the processing device.

In another embodiment, the testing network 142 may be a wireless network. In this embodiment, the MTC device 154 may be configured with a transceiver to wirelessly communicate with the testing control module 110 to perform monitoring, troubleshooting, controlling, calibrating and/or configuring of the DTV 108. The MTC device 154 may be configured to communicate according to any number of wireless technologies. In one exemplary embodiment, the MTC device 154 may be a Bluetooth® device having a corresponding transceiver (not shown) configured to communicate with a transceiver (not shown) in the testing control module 110.

In another exemplary embodiment, the MTC device 180 may be implemented as any type of device configured to communicate with the testing control module 110 from a geographical or location that is not proximate to the geographical location of the testing control module 110. In the embodiment shown, the MTC device 180 may be communicatively coupled to a service access network 170, which is communicatively coupled to a router 160, which is communicatively coupled to an interface port (not shown) of the DTV testing module 104 via network 158. Accordingly, the testing network 142 may include the MTC device 180, the service access network 170 and the router 160.

In various embodiments, router 160 may be a router configured for broadband premise use. The interface port by which router 160 may be communicatively coupled to the DTV testing module 104 may be an Ethernet interface port. The Ethernet interface port may be optoisolated from the router to provide protection from galvanic disturbances from stray AC voltage on the metallic connections of the router.

In various exemplary embodiments, the service access network 170 may be a wired network, wireless network, fiber optic network or a combination thereof. In various embodiments, the service access network 170 may be any network configured to transmit information between the MTC device 180 and the router 160. In various embodiments, the service access network 170 may be the network over which digital content used for providing video and audio presentation from the DTV 108 is transmitted.

For example, a wired network may be any number of types of networks including, but not limited to, the internet, a cable network or the like. Wireless networks may be any number of types of networks, including, but not limited to, satellite, over-the-air digital broadcast networks. One exemplary embodiment of a fiber optic network may be a Fiber To The Premises ("FTTP") network. For example, in one embodiment, the service access network 170 be used to provide Fiber Optic Services ("FiOS")® service to devices, including, but not limited to, FiOS-TV™ television or other televisions configured to receive digital content either with its independent internal digital tuner or in conjunction with a digital-to-analog ("D/A") set top box (not shown) coupled to the television, which may be located in a consumer's premise.

Figure 2:
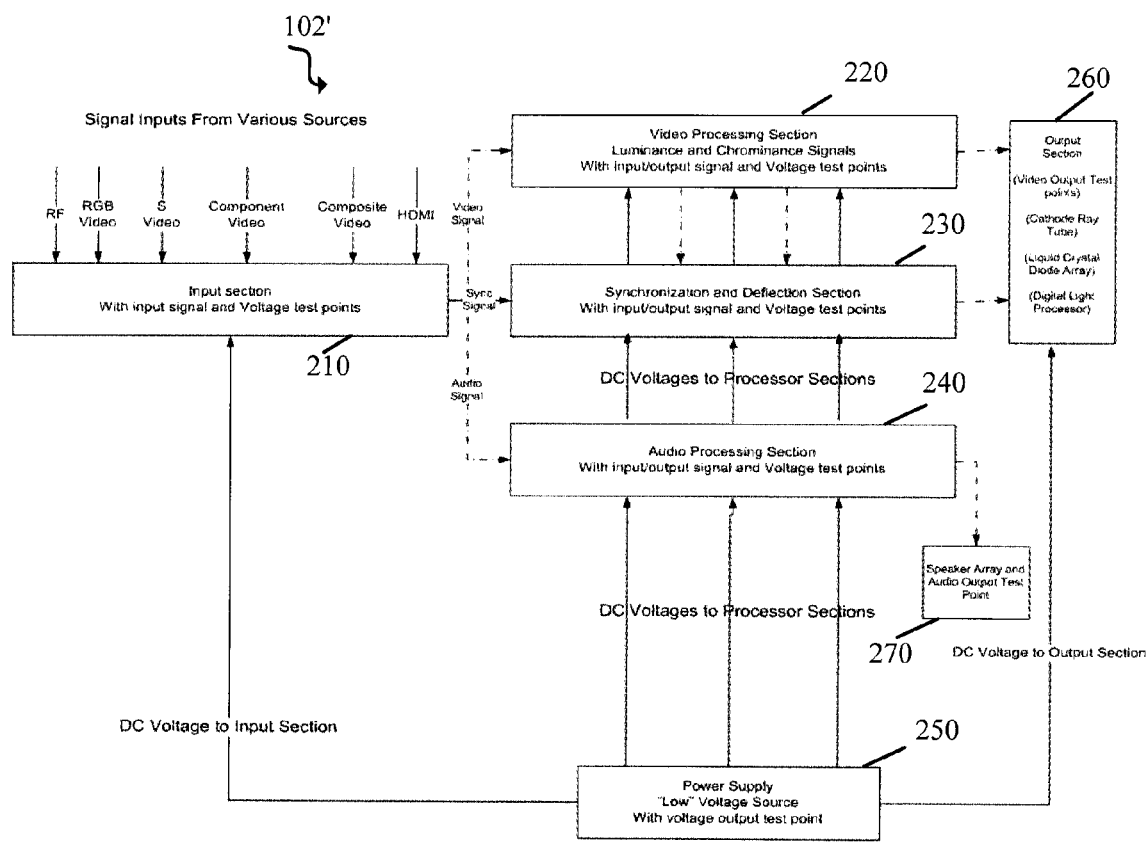
FIG. 2 is a schematic diagram of a DTV testing module in accordance with exemplary embodiments.

FIG. 2 is a schematic diagram of a DTV functionality module in accordance with exemplary embodiments. The DTV functionality module 102' controls each of the audio and/or video presentations for providing DTV 108 to a consumer. In some embodiments, the functionality module 102' controls the provisioning of the aforementioned support services such as picture in picture, voice over internet protocol ("VoIP"), speaker phone, caller identification, video phone applications and the like. In an exemplary embodiment, the DTV 108 may be configured with a plurality of communicatively coupled system sections to provide DTV 108 functionality.

In exemplary embodiments, each system section may include one or more input or output access points from which data may be input or output to and from the system section, respectively. In these embodiments, each system section may include one or more intermediate access points from which data may be input or output within the system section or to or from convergence and reflection coils in the system sections.

In the embodiment shown, the DTV functionality module 102' may include an input system section 210 communicatively coupled to a video processing system section 220, a synchronization and deflection system section 230 and/or an audio processing system section 240. The DTV functionality module 102 may include an output system section 260 communicatively coupled to the video processing system section 220 and/or the synchronization and deflection system section 230. The DTV functionality module 102' may include a audio output system section 270 communicatively coupled to the audio processing system section 240 and a power supply system section 250 coupled to the input system section 210, the audio processing system section 240, the synchronization and deflection system section 230, the video processing system section 220 and/or the output system section 260.

In various exemplary embodiments, the system sections and the manner for processing data, which may be in the form of signals, voltage or current levels or otherwise, may be as follows. The input system section 210 of the DTV functionality module 102' may be configured to receive data, in the form of one or more signals, from one or more sources, and in the form of DC voltage. The signals may include, but are not limited to, radio frequency ("RF") digital or analog, component video, S video, high definition multimedia interface ("HDMI") or composite video signals. The input system section 210 may be configured to use downconversion to convert RF into intermediate frequency ("IF") into audio/video signals.

The input system section 210 may be configured to separate the audio/video signals into component parts, which may include synchronization and deflection signal, video and audio signals. The synchronization and deflection signal controls, at least in part, vertical and horizontal synchronization and deflection; the video signal controls, at least in part, luminance and chrominance; and the audio signal controls, at least in part, the left and right stereo presentation of the DTV 108.

The input system section may be configured to output the synchronization and deflection, the video and the audio signals to the synchronization and deflection system section 230, the video processing section, 220 and the audio processing section 240, respectively.

The input system section 210 may include input, output and/or intermediate signals and voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith.

The video system section 220 may be configured to receive the video signal and separate the video signal into component parts: luminance (Y signal) and Chrominance (RBG signal), where G may be derived from Y-(R+B), and horizontal pulses and vertical pulses. The Y signal may be input into the control grids (not shown) of a cathode ray tube ("CRT") for a projection DTV 108 or into a matrix (not shown) for an LCD, plasma, and/or a DLP DTV 108 or into any suitable mechanism configured to receive such signal and provide a video display for a digital television. The RBG data may be input into the cathode of a CRT or into a matrix for an LCD, plasma, a DLP DTV 108 or into any suitable mechanism configured to receive such data and provide a video display for a digital television. The matrix may be used to mix the video signal and the sync pulses from the video signal to create the visual display on the screen of the DTV 108. However, for DLP DTV 108, the Y signal may be transmitted to a DLP chip transistor controlled mirror array (not shown) and the signal and sync pulses may be transmitted to a color wheel processor (not shown). The video processing system section 220 may transmit to and receive from the synchronization signals processed by the video processing system section 220.

The video processing system section 220 may include input, output and/or intermediate signals and voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith. In one embodiment, the signals are luminance and/or chrominance signals.

The synchronization and deflection system section 230 may receive the synchronization signals from the input system section 210 and/or the video processing system section 220 and process the synchronization signals to provide picture lock thereby preventing or reducing the likelihood of loss of horizontal and vertical synchronization and the associated tearing and rolling of the visual display of the DTV 108. For CRT and projection DTVs 108, the synchronization and deflection system section 230 may provide a signal to one or more deflection yoke transformers (not shown). For projection DTVs 108, the signal may be provided to one or more amplifier-driven convergence yoke transformers in the case of projection DTVs 108. For LCD and plasma DTVs 108, the signals may be transmitted to a picture matrix (not shown). For DLP DTVs 108, the signals may be transmitted to a chip, such as an MMP chip (not shown), and color wheel (not shown). The synchronization and deflection system section 230 may include input, output and/or intermediate signals and voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith.

The audio processing system section 240 may be configured to receive and filter the audio signal, apply the filtered signal to a stereo audio amplifier and to speakers (not shown) of the DTV 108. The audio processing system section 240 may include input, output and/or intermediate signals and voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith.

The power supply system section 250 may be configured to provide low and high voltage to one or more of the sections 210, 220, 230, 240 and/or 260. The section 250 may use switching power supply functionality for supplying the low voltage while using horizontal pulses to create the high voltage. The high voltage may be used by CRTs in tube type projection DTVs 108 and single CRT DTVs 108. The section 250 may provide DC voltages to sections 210, 220, 230, 240 and 270.

The power supply system section 250 may include output and/or intermediate voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith. In one embodiment, the section 250 provides a voltage output test point.

The output system section 260 may be configured to receive signals output from the video processing system section 220, the synchronization and deflection system section 230, the audio processing system section 240 and/or the power supply system section 250. The output system section 260 may be configured to interface the received signals with an output device of the DTV 108. Output devices of DTVs 108 may include, but are not limited to, CRTs, LCD arrays and/or DLPs. The output system section 260 may include input, output and/or intermediate voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith. In one embodiment, section 260 provides a video output test point.

The audio output system section 270 may be configured to receive signals output from the audio processing system section 240. The section 270 may include input, output and/or intermediate voltage test points (not shown) for monitoring, troubleshooting, controlling, calibrating and/or configuring the functionality of the DTV 108 associated with the data indicative of the aforementioned signals and/or the audio, video, synchronization, power or other phenomena associated therewith. In one embodiment, section 270 provides an audio output test point.

Figure 3:
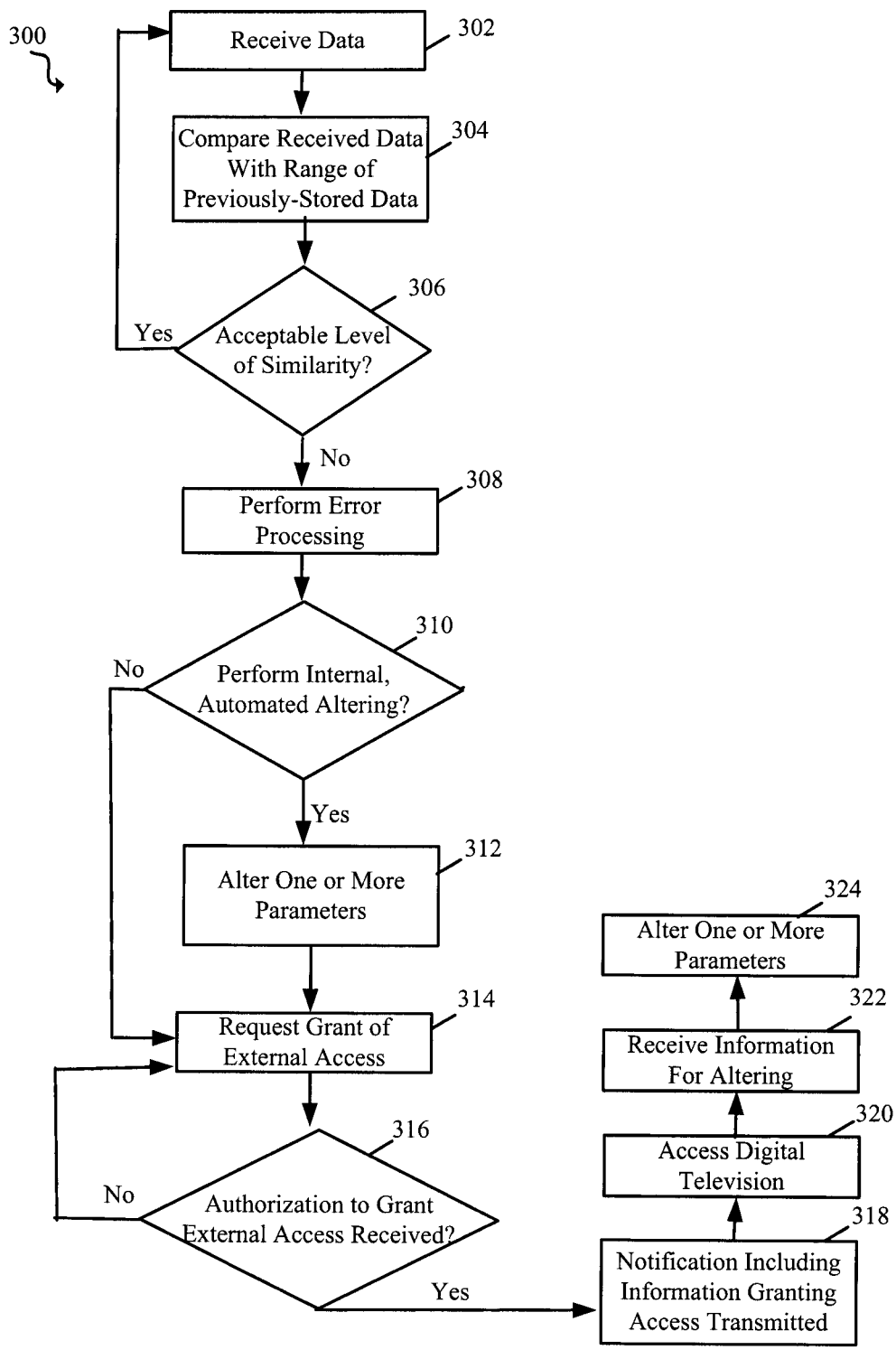
FIG. 3 is a flow chart of a method of operation of a DTV testing module in accordance with exemplary embodiments.

FIG. 3 is a flow chart of a method of operation of a DTV testing module in accordance with exemplary embodiments. FIG. 3 represents an exemplary embodiment and may be not meant to be limiting. In particular, the method 300 may be executed or otherwise performed by one or a combination of various method steps. The method 300 and/or its steps are not limited to any particular type of structure, whether hardware, software or a combination of hardware and software. With regard to hardware, the method 300 may be performed by analog or digital circuitry such as that found in any number of devices, including, but not limited to, integrated circuits, an Application-Specific Integrated Circuit ("ASIC") chip designed specifically for testing the DTV functionality module 102, 102' shown in FIG. 1 or 2. With regard to software, the method 300 may be performed by a computer-readable medium having an executable computer program for performing the steps of the methods described herein.

The method 300 of FIG. 3 shall be described with reference to FIG. 3 and/or to FIGS. 1 and/or 2 where applicable. In some embodiments, method 300 may be initiated at a frequency as determined by the designer of the DTV 108, the consumer of the DTV 108 or the like. The frequency for initiating the method 300 may be the frequency for monitoring the DTV 108. To initiate method 300, the testing control module 110 may send to the DTV 108 information indicative of a request for data from one or more system sections. In some embodiments, one or more system sections may be configured to initiate transmission of data to the DTV testing module 104 upon the occurrence of an event in the system section or at a frequency as determined by the designer of the DTV 108, by the consumer of the DTV 108 or the like.

At block 302 of method 300, data indicative of functionality may be received. In exemplary embodiments, the data may be received by the testing control module 110 and/or the data gathering module 120 from the DTV functionality module 102, 102'. The data may be indicative of the functionality of the DTV functionality module 102, 102'. The data may be indicative of a signal and/or a voltage at an input, intermediate or output test point in the DTV functionality module 102, 102'.

In one embodiment, the testing control module 110 may include a data logging module 112 configured to store information indicative of the received data. The stored information may be stored permanently or until output to the storage module 130. The storage module 130 may be any module configured to provide information storage and that may be removable from the DTV testing module 104. In exemplary embodiments, the storage module 130 may be a compact disc ("CD"), a digital versatile disc ("DVD"), floppy disk or memory stick.

At block 304, in response to receiving data indicative of functionality, the received data may be compared with a range of previously-stored data. The range of previously-stored data may be indicative of the normal functionality of the DTV 108, factory settings for the DTV 108, consumer selection, a judgment of a third-party DTV repair vendor service technician and/or otherwise.

The data may be compared by the testing control module 110. In various embodiments, the range of the previously-stored data may be stored inside of the data logging module 112 of the testing control module 110, in the storage module 130 or in a database remote from the testing control module 110. The database (not shown) may be accessed over the testing network 142 by the testing control module 110. The database may be located at the location of a third-party DTV repair vendor or at the DTV 108 manufacturer location, at a location on the internet or otherwise.

At block 306, a determination may be made as to whether the received data may be inside or outside of a range of acceptable similarity to a range of previously-stored data.

At block 308, in response to the received data being outside of a range of acceptable similarity to the range of the previously-stored data, the received data may be determined to be indicative of a deviation or failure event and error processing may be performed on the received data. Error processing may include one or more of the following: troubleshooting, logging the information indicative of the detected deviation or failure event in the data logging module 112, storing the information in the storage mechanism 130, generating a report indicative of the detected deviation or failure event and/or generating a report indicative of the detected deviation or failure event and one or more past deviations or failure events. Error processing may be performed by the testing control module 110.

In response to the received data not being outside of a range of acceptable similarity to the range of the previously-stored data, the method 300 goes to block 302.

At block 310, in response to performing error processing, a determination may be made as to whether to perform internal automated altering of one or more parameters of the DTV 108. A parameter of a DTV 108 may be indicative of a configuration value or range of values in or resultant from the operation of software associated with the DTV 108. A parameter of a DTV 108 may be indicative of a physical quantity in or resultant from the operation of hardware associated with the DTV 108. An example of a physical quantity may be a voltage level or a current level.

Altering of the one or more parameters of the DTV 108 may include calibration and/or configuration of the one or more parameters. The determination may be made by the testing control module 110. The determination may be a function of a consumer previously-configured setting or it may be a function of information input by the consumer when prompted to do so by the testing control module 110 at the time of the detected deviation or failure event. The previously-configured setting may be stored in the testing control module 110 or on the storage mechanism 130.

If it may be determined to perform automated, internal calibration and/or configuration, at block 312, altering of one or more of the parameters of the DTV 108 (i.e., troubleshooting, calibration and/or configuration) may be performed. If it may be determined not to perform automated, internal calibration and/or configuration, at block 314, a request to grant external access may be transmitted. Access may be granted to the DTV 108 from one or more devices external to the DTV 108 such as an MTC device 150, 154, 180. The request may be transmitted from the DTV 108 to a consumer of the DTV 108. The request may be transmitted to the consumer via audio or video presentation upon the consumer turning on the DTV 108, by electronic mail or otherwise.

At block 316, it may be determined whether authorization to grant access has been received. The testing control module 110 may determine such. In one embodiment, the I/O device 104 may receive the information indicative of whether to grant access. For example, a consumer may access the DTV 108 through a wired or wireless device (not shown) communicatively coupled to the I/O device 104.

At block 318, in response to receiving authorization to grant access to the DTV 108, a notification including information for granting access and indicative of the detected deviation or failure event may be transmitted. The information may be transmitted from the DTV testing module 104 to a third-party vendor location, a MTC device 150, 154, 180 or the like.

In response to not receiving authorization to grant access to the DTV 108, the method 300 goes to 312. The testing control module 110 may determine whether it has received information from the consumer indicative of the consumer granting access to an MTC device 150, 154, 180 to access the DTV 108.

The method 300 may go to block 310 at a selected frequency to request that the consumer respond to the DTV 108 as to whether the testing control module 110 may grant access to the DTV 108. The frequency may be every 24 hours, once a week, once a month or each time the consumer turns the DTV 108 on.

At block 320, in response to receiving the information for granting access and indicative of the detected deviation or failure event, the DTV 108 may be accessed for troubleshooting, calibration and/or configuration. The DTV 108 may be accessed locally or remotely by a diagnostic monitor and control device.

At block 322, information for altering (i.e., calibration and/or configuration) may be received. The information may be for altering one or more parameters of the DTV 108. The information may be received by the I/O device 104, which may transmit to the testing control module 110 information indicative of the received information.

At block 324, in response to receiving the information for altering the DTV 108, altering of the DTV 108 (i.e., calibration and/or configuration) may be performed. The testing control module 110 may receive the information for altering the DTV 108 and transmit control signals to the corresponding system section for which calibration and/or configuration is being performed in order to alter one or more of the parameters of the DTV 108 in one or more ways. For example, the testing control module 110 may send a control signal that calibrates the horizontal frequency of the DTV 108.

Figure 4:
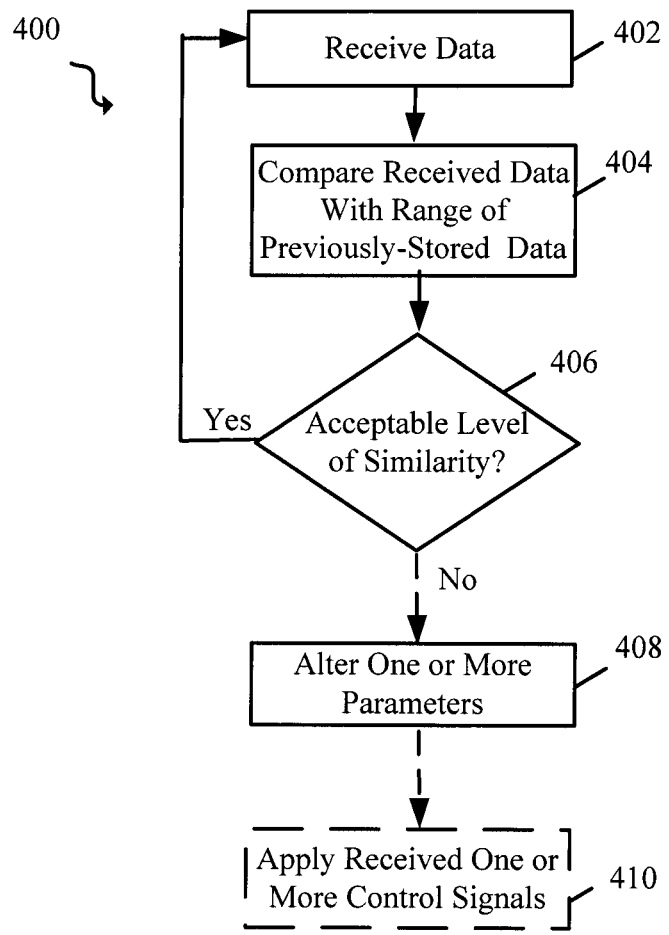
FIG. 4 is a flow chart of another method of operation of a DTV testing module in accordance with exemplary embodiments.

FIG. 4 is a flow chart of another method of operation of a DTV testing module in accordance with exemplary embodiments. FIG. 4 is a flow chart of a method of operation of a DTV testing module in accordance with exemplary embodiments. FIG. 4 represents an exemplary embodiment and may be not meant to be limiting. In particular, the method 400 may be executed or otherwise performed by one or a combination of various method steps. The method 400 and/or its steps are not limited to any particular type of structure, whether hardware, software or a combination of hardware and software. With regard to hardware, the method 400 may be performed by analog or digital circuitry such as that found in any number of devices, including, but not limited to, integrated circuits, an Application-Specific Integrated Circuit ("ASIC") chip designed specifically for testing the DTV functionality module 102, 102' shown in FIG. 1 or 2. With regard to software, the method 400 may be performed by a computer-readable medium having an executable computer program for performing the steps of the methods described herein.

The method 400 of FIG. 4 shall be described with reference to FIG. 4 and/or to FIGS. 1, 2 and/or 3 where applicable. In some embodiments, method 400 may be initiated at a frequency as determined by the designer of the DTV 108, the consumer of the DTV 108 or the like. The frequency for initiating the method 400 may be the frequency for monitoring the DTV 108. To initiate method 400, the testing control module 110 may send to the DTV 108 information indicative of a request for data from one or more system sections. In some embodiments, one or more system sections may be configured to initiate transmission of data to the DTV testing module 104 upon the occurrence of an event in the system section or at a frequency as determined by the designer of the DTV 108, by the consumer of the DTV 108 or the like.

At block 402 of method 400, data indicative of functionality may be received. In exemplary embodiments, the data may be received by the testing control module 110 and/or the data gathering module 120 from the DTV functionality module 102, 102'. The data may be indicative of the functionality of the DTV functionality module 102, 102'. The data may be indicative of a signal and/or a voltage at an input, intermediate or output test point in the DTV functionality module 102, 102'.

In one embodiment, the testing control module 110 may include a data logging module 112 configured to store information indicative of the received data. The stored information may be stored permanently or until output to the storage module 130. The storage module 130 may be any module configured to provide information storage and that may be removable from the DTV testing module 104. In exemplary embodiments, the storage module 130 may be a compact disc ("CD"), a digital versatile disc ("DVD"), floppy disk or memory stick.

At block 404, in response to receiving data indicative of functionality, the received data may be compared with a range of previously-stored data. The range of previously-stored data may be indicative of the normal functionality of the DTV 108 and/or may be indicative of the factory settings for the DTV 108. The data may be compared by the testing control module 110. In various embodiments, the range of the previously-stored data may be stored inside of the data logging module 112 of the testing control module 110, in the storage module 130 or in a database remote from the testing control module 110. The database (not shown) may be accessed over the testing network 142 by the testing control module 110. The database may be located at the location of a third-party DTV repair vendor or at the DTV 108 manufacturer location, at a location on the internet or otherwise.

At block 406, a determination may be made as to whether the received data may be inside or outside of a range of acceptable similarity to a range of previously-stored data. The testing control module 110 may make the determination. The determination may be made after one or more of the following: generating reports indicative of the received data and/or the received data and the range of the previously-stored data; troubleshooting using the received data; comparing the received data to the range of the previously-stored data to determine whether a level of similarity between the received data and the range of the previously-stored data is within an acceptable range and/or is greater than or equal to a selected value. The value may be indicative of a consumer selection, a factory setting, a judgment of a third-party DTV repair vendor service technician or otherwise.

At block 408, in response to determining that the received data is outside of the range of acceptable similarity to the range of the previously-stored data, one or more parameters may be altered. The parameters may be the parameters of the DTV 108. In some embodiments, the testing control module 110 may alter the parameters. In other embodiments, an MTC device 150, 154, 180 may alter the parameters. Altering the one or more parameters of the digital television may include performing calibration and/or configuration of the DTV 108 by applying one or more control signals to one or more system sections and/or components of the DTV 108.

The application of the one or more control signals may be an automated, internal process performed by the testing control module 110. In some embodiments, the generation of the control signals may be performed external to the testing control module 110 and the DTV 108 at an MTC device 150, 154, 180. In some of these cases, the MTC device 150, 154, 180 may apply the one or more control signals to the DTV 108. In some embodiments, the control signals are transmitted to one or more system sections and/or one or more components within the DTV testing module 104 and/or the DTV functionality module 102, that may receive the control signals. In some embodiments, a processor, micro-processor, computer, ASIC or the like may receive the one or more control signals and control the one or more system sections and/or one or more components in a manner indicative of the one or more control signals.

In some embodiments, altering one or more parameters of the DTV 108 includes, requesting and receiving authorization to grant an MTC device 150, 154, 180 that is external to the DTV 108, access to the DTV 108. The testing control module 110 may request and receive the authorization. The testing control module 110 may request the authorization from a consumer of the DTV 108. The consumer of the DTV 108 may provide authorization to grant access and such authorization may be received by the DTV 108. The authorization may be received by the testing control module 110 of the DTV 108 in some embodiments.

In some embodiments, as shown in block 410, in response to requesting and receiving authorization to grant access to the DTV 108, the testing control module 110 in the DTV 108 and/or any other component associated with the DTV 108 may receive one or more control signals adapted to be received by the DTV 108 to alter the one or more parameters of the DTV 108. The one or more control signals may be received from the MTC device 150, 154, 180 that is granted access to the DTV 108.

It may be further noted that the computer-readable mediums described herein may be tangibly embodied in one or more physical media, such as, but not limited to, a CD, a DVD, a floppy disk, a hard drive, read only memory ("ROM"), random access memory ("RAM"), as well as other physical media capable of storing software, and/or combinations thereof.

It should be noted that although the flow charts provided herein show a specific order of method steps, it may be understood that the order of these steps may differ from what may be depicted. Also two or more steps may be performed concurrently or with partial concurrence. Such variation will depend on the software and hardware systems chosen and/or on designer choice. It may be understood that all such variations are within the scope of the exemplary embodiments. Likewise, software and/or web implementations of the exemplary embodiments could be accomplished with standard programming techniques with rule based logic and/or other logic to accomplish the various steps.

It may be further noted that the figures illustrate various components as separate entities from one another. The illustration of components as separate entities from one another may be merely exemplary. The components may be combined, integrated, separated and/or duplicated to support various applications. Further, the functions described as being performed at various components may be performed at other components, and/or the various components may be combined and/or separated.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a functionality module configured to perform one or more functions of a digital television unit; and
a testing module, comprising a computer processor, associated with the digital television unit; communicatively coupled to the functionality module and being configured to:
receive from the functionality module, data indicative of the one or more functions of the digital television unit; and
perform processing using the received data to determine whether to alter one or more parameters associated with the one or more functions of the digital television, wherein the processing includes:
comparing the received data with a range of previously-stored data indicative of a selected type of setting of the digital television unit;
determining whether a level of similarity between the received data and the range of the previously-stored data is acceptable; and
determining that the level of similarity between the received data and the range of the previously-stored data is not acceptable if the difference between the received data and the range of the previously-stored data is greater than or less than a selected value.

2. The system of claim 1, wherein performing processing using the received data comprises one or more of: performing automatic, internal troubleshooting using the received data; or generating a report using the received data.

3. The system of claim 1, wherein the received data is indicative of a horizontal frequency value of the digital television unit and the range of the previously-stored data is indicative of a factory recommended setting of horizontal frequency value and the level of similarity between the horizontal frequency value and the factory recommended setting of horizontal frequency value is not acceptable when the difference between the horizontal frequency value and the factory recommended setting of horizontal frequency is greater than or less than 50 kHz.

4. The system of claim 1, wherein the testing module is configured such that, after the testing module determines that one or more of the parameters of the digital television unit should be altered, the testing module grants a testing network access to the digital television unit and is configured to receive from the testing network, information configured to alter the one or more parameters of the digital television unit.

5. The system of claim 4, wherein the testing control module is configured to grant access to the testing network after receiving information indicative of authorization to grant access to the testing network.

6. The system of claim 1, wherein the one or more parameters of the digital television unit is indicative of one or more of: horizontal frequency, convergence or a voltage level at an anode of the digital television unit.

7. The system of claim 1, further comprising the testing module being configured to store the received data in a storage module removably coupled to the testing module.

8. The system of claim 1, wherein altering one or more parameters of the digital television unit comprises calibrating the one or more parameters of the digital television unit.

9. The system of claim 1, wherein altering one or more parameters of the digital television unit comprises configuring the one or more parameters of the digital television.

10. A system comprising:
a testing control mechanism, comprising a computer processor, associated with a digital television unit and being configured to:
receive from a functionality module configured to control one or more functions of the digital television unit, data indicative of the one or more functions of the digital television unit; and
perform processing using the received data to determine whether to alter one or more parameters associated with the one or more functions of the digital television unit, wherein the processing includes:
comparing the received data with a range of previously-stored data indicative of a selected type of setting of the digital television unit;
determining whether a level of similarity between the received data and the range of the previously stored is acceptable; and
determining that the level of similarity between the received data and the range of the previously-stored data is not acceptable if the difference between the received data and the range of the previously-stored data is greater than or less than a selected value.

11. The system of claim 10, wherein performing processing using the received data comprises one or more of: performing automatic, internal troubleshooting using the received data; or generating a report using the received data.

12. The system of claim 10, wherein the testing control mechanism is configured such that, after the testing control mechanism determines that one or more of the parameters of the digital television unit should be altered, the testing control mechanism grants a testing network access to the digital television unit and is configured to receive from the testing network, information configured to alter the one or more parameters of the digital television unit.

13. The system of claim 10, wherein the testing control mechanism is configured to grant access to the testing network after receiving information indicative of authorization to grant access to the testing network.

14. The system of claim 10, wherein the one or more parameters of the digital television unit is indicative of one or more of: horizontal frequency, convergence or a voltage level at an anode of the digital television unit.

15. The system of claim 10, further comprising the testing control mechanism being configured to store the received data in a storage module removably coupled to the testing control mechanism.

16. A method comprising:
receiving, at a testing module associated with a digital television unit, data indicative of functionality of the digital television unit, wherein the data is received from a functionality module configured to perform one or more functions of the digital television unit;
in response to receiving the data indicative of functionality, comparing the received data with a range of previously-stored data using a testing module comprising a computer processor;
in response to comparing the received data with the range of the previously-stored data, determining whether the received data is outside of a range of acceptable similarity to the range of the previously-stored data;
in response to determining that the received data is outside of the range of acceptable similarity to the range of the previously-stored data, altering one or more parameters of the digital television unit.

17. The method of claim 16, wherein altering one or more parameters of the digital television unit comprises performing internal, automated calibration or configuration of the digital television unit.

18. The method of claim 16, wherein altering one or more parameters of the digital television unit comprises: in response to requesting and receiving authorization to grant access to the digital television unit to a device external to the digital television unit, receiving one or more control signals adapted to be received by the digital television unit to alter the one or more parameters of the digital television unit; and applying the one or more control signals to the digital television unit to alter the one or more parameters of the digital television unit.

19. A non-transitory computer-readable medium having an executable computer program comprising instructions to perform steps of the method of claim 16.

* * * * *